(12) United States Patent
Karlsson

(10) Patent No.: US 11,919,145 B2
(45) Date of Patent: Mar. 5, 2024

(54) WALL FASTENING

(71) Applicant: Hilti Aktiengesellschaft, Schaan (LI)

(72) Inventor: Kenth Karlsson, Wasserburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/252,531

(22) PCT Filed: Jul. 2, 2019

(86) PCT No.: PCT/EP2019/067675
§ 371 (c)(1),
(2) Date: Dec. 15, 2020

(87) PCT Pub. No.: WO2020/011592
PCT Pub. Date: Jan. 16, 2020

(65) Prior Publication Data
US 2021/0260747 A1    Aug. 26, 2021

(30) Foreign Application Priority Data

Jul. 9, 2018 (EP) .................................. 18182400

(51) Int. Cl.
| | |
|---|---|
| B25H 3/04 | (2006.01) |
| A47F 5/08 | (2006.01) |
| B25H 3/02 | (2006.01) |
| B62B 1/12 | (2006.01) |
| B62B 1/26 | (2006.01) |

(52) U.S. Cl.
CPC ............... *B25H 3/04* (2013.01); *A47F 5/08* (2013.01); *B25H 3/028* (2013.01); *B62B 1/12* (2013.01); *B62B 1/26* (2013.01); *B62B 2202/48* (2013.01); *B62B 2205/12* (2013.01); *B62B 2205/32* (2013.01)

(58) Field of Classification Search
CPC .. B25H 3/04; B25H 3/028; A47F 5/08; B62B 1/12; B62B 1/26; B62B 2202/48; B62B 2205/12; B62B 2205/32
See application file for complete search history.

(56) References Cited

U.S. PATENT DOCUMENTS

| | | | | |
|---|---|---|---|---|
| 5,378,005 A | * | 1/1995 | Norton | B25H 3/00 |
| | | | | 206/349 |
| 5,755,414 A | * | 5/1998 | Remmers | A47F 5/08 |
| | | | | 211/70.6 |
| 5,762,210 A | * | 6/1998 | Dahill | A47F 7/0021 |
| | | | | 211/60.1 |

(Continued)

FOREIGN PATENT DOCUMENTS

| | | |
|---|---|---|
| CN | 1886302 A | 12/2006 |
| CN | 101663198 A | 3/2010 |

(Continued)

OTHER PUBLICATIONS

International Search Report of PCT/EP2019/067675, dated Sep. 26, 2019.

*Primary Examiner* — Stanton L Krycinski
(74) *Attorney, Agent, or Firm* — Davidson, Davidson & Kappel, LLC

(57) ABSTRACT

The use of a load transporter for transporting loads, preferably tool cases, as a rack system, the load transporter being fastened on a wall by at least one adjustable fastening device arranged on the wall.

7 Claims, 12 Drawing Sheets

(56) References Cited

U.S. PATENT DOCUMENTS

| | | | | |
|---|---|---|---|---|
| D447,848 S * | 9/2001 | Laga | ............................ | D34/27 |
| D450,904 S * | 11/2001 | Laga | ............................ | D34/27 |
| 6,669,033 B1 * | 12/2003 | Lian | ....................... | F16B 47/00 |
| | | | | D6/540 |
| 6,766,997 B2 * | 7/2004 | Stewart, III | ........... | B25H 3/006 |
| | | | | 224/551 |
| 7,527,157 B2 * | 5/2009 | Shinn | .................... | B25H 3/006 |
| | | | | 211/119 |
| D653,832 S * | 2/2012 | Vilkomirski | .................. | D34/25 |
| 8,132,819 B2 * | 3/2012 | Landau | ................. | B25H 3/028 |
| | | | | 280/47.26 |
| 8,226,092 B2 * | 7/2012 | Oliver | ...................... | B25H 3/00 |
| | | | | 280/47.18 |
| 8,567,796 B2 * | 10/2013 | Bar-Erez | ................ | B25H 3/023 |
| | | | | 280/47.18 |
| 8,657,307 B2 * | 2/2014 | Lifshitz | ................... | B25H 3/02 |
| | | | | 280/47.18 |
| 8,746,647 B2 * | 6/2014 | Stewart, III | ............. | B62B 5/00 |
| | | | | 248/506 |
| 9,096,249 B2 * | 8/2015 | Gibson | .................... | B62B 1/12 |
| 9,132,543 B2 * | 9/2015 | Bar-Erez | ................ | B65D 43/16 |
| 9,388,936 B2 * | 7/2016 | Stewart, III | ............. | B62B 5/00 |
| 9,566,990 B2 * | 2/2017 | Bar-Erez | ................ | A47B 47/00 |
| 10,330,252 B2 * | 6/2019 | Abohammdan | ....... | B65D 19/38 |
| 10,661,818 B2 * | 5/2020 | Guirlinger | ............. | A45F 5/021 |
| 10,793,172 B2 * | 10/2020 | Brunner | ................ | B65D 21/00 |
| 2007/0227411 A1 | 10/2007 | Rasmusson et al. | | |
| 2010/0178129 A1 | 7/2010 | Helmner et al. | | |
| 2014/0375181 A1 | 12/2014 | Bar-Erez et al. | | |
| 2018/0186513 A1 | 7/2018 | Brunner | | |
| 2020/0189637 A1 * | 6/2020 | Karlsson | ............. | B62B 5/0495 |

FOREIGN PATENT DOCUMENTS

| | | |
|---|---|---|
| CN | 206290197 U | 6/2017 |
| CN | 107265108 A | 10/2017 |

* cited by examiner

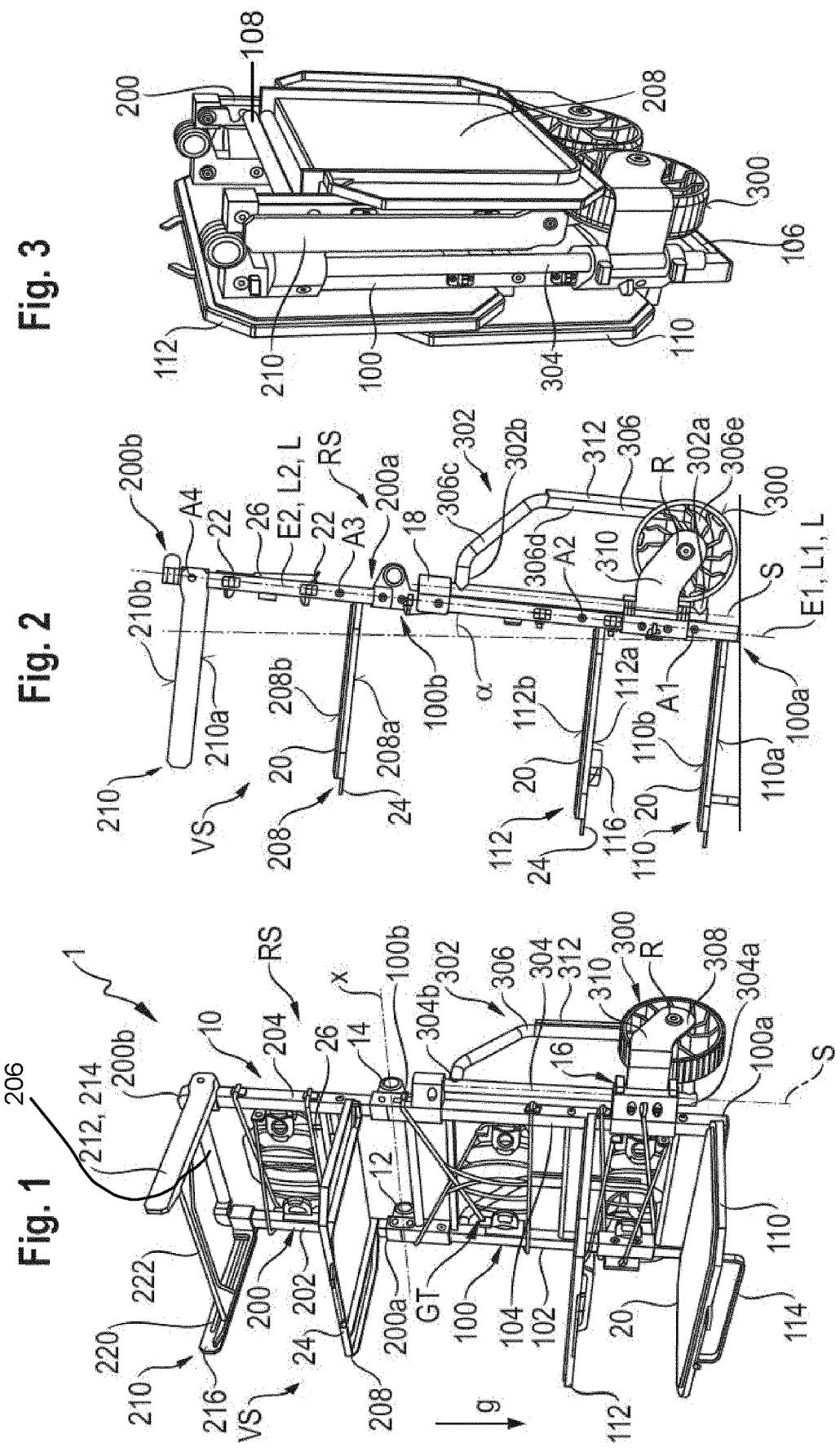

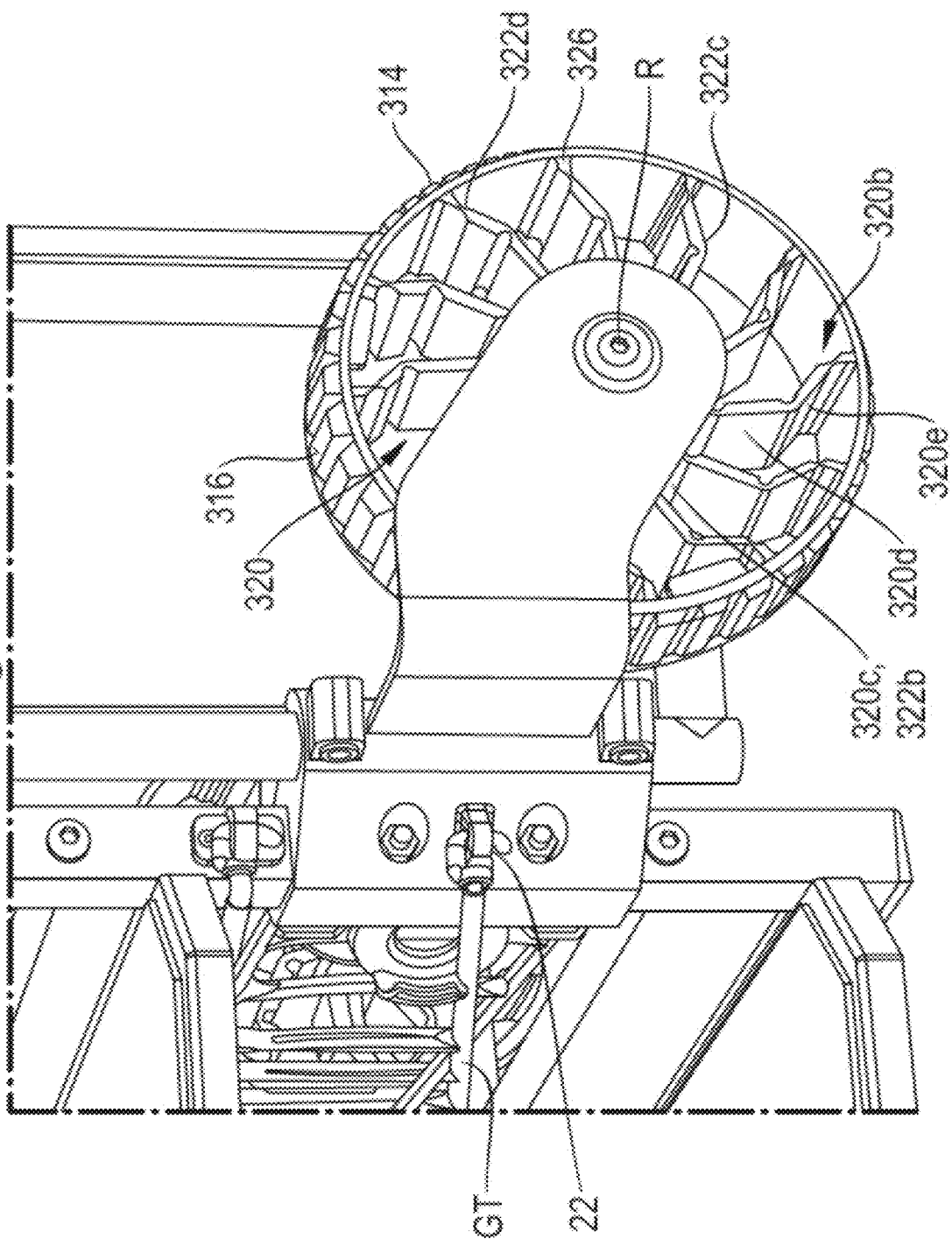

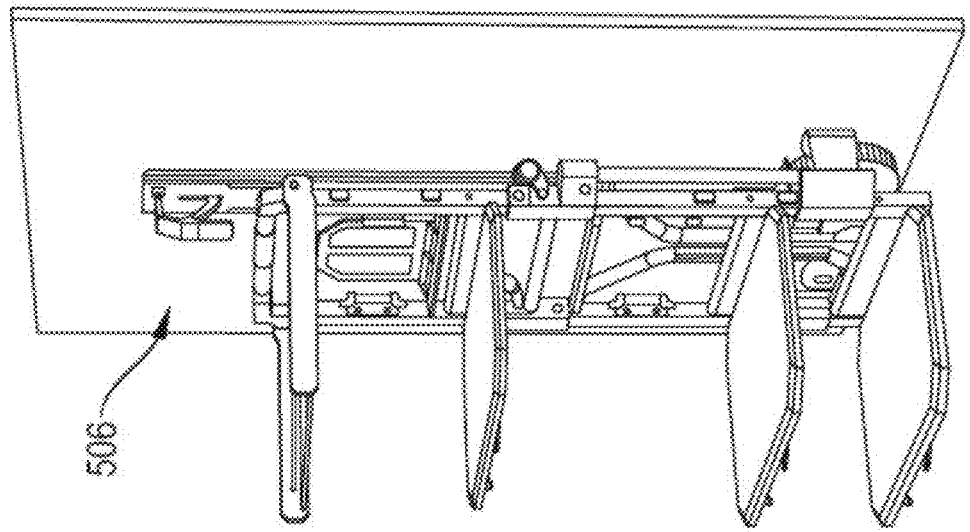
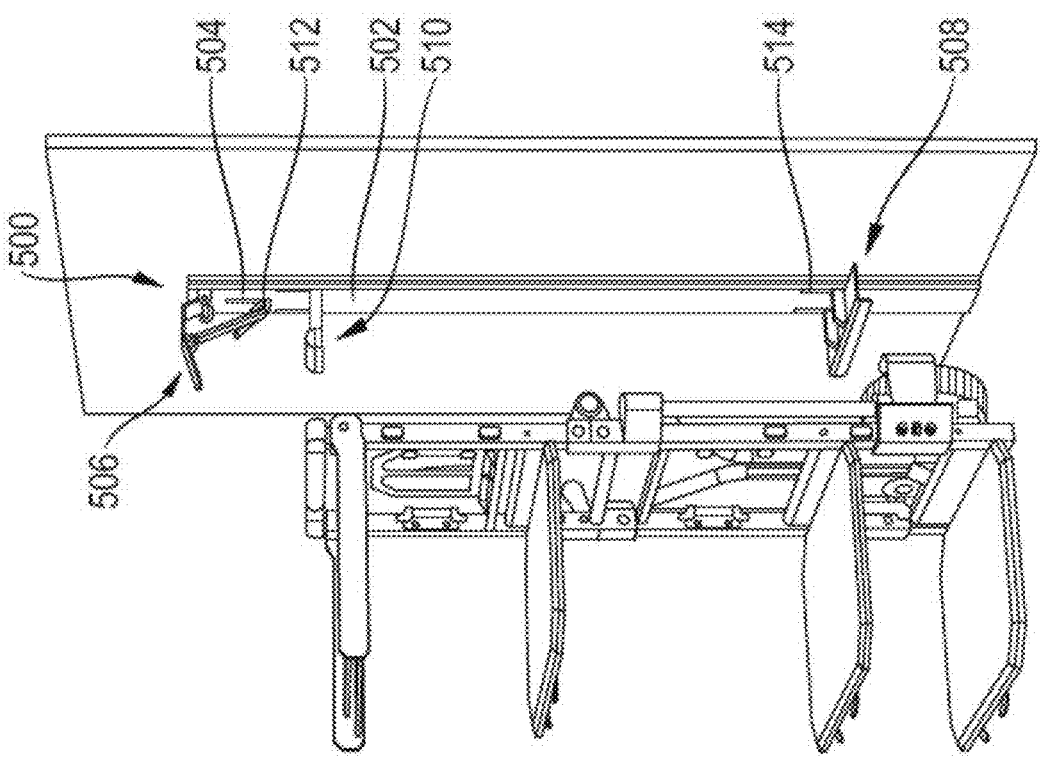

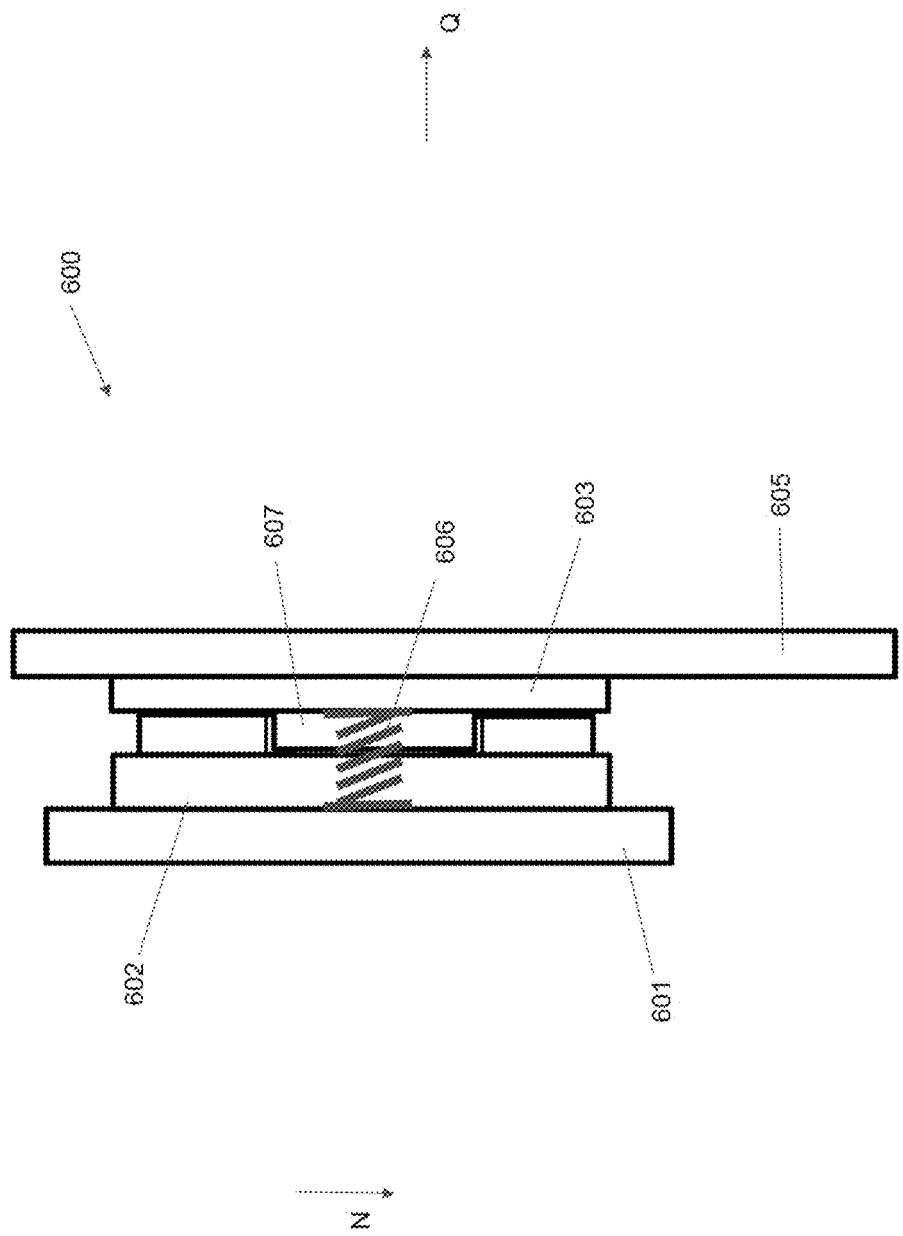

WALL FASTENING

BACKGROUND

Load transporters of the type mentioned at the beginning are known in principle from the prior art, for example in the form of sack trucks.

The secure fastening of a laden load transporter on a wall often proves to be problematic, since load transporters laden with loads can easily fall over when they are no longer being guided or held by a user. In addition, for reasons of safety, and in particular to avoid tipping over of a laden load transporter, when the load transporter is no longer being guided or held by a user the loads must be taken off the load transporter and stowed elsewhere. A specific problem arises when transporting a load transporter laden with loads in a vehicle. For safe transportation of the load transporter and the loads, on the one hand the loads must be taken off the load transporter and safely stowed and on the other hand the load transporter must also be secured.

SUMMARY OF THE INVENTION

An object of the present invention is to solve the aforementioned problem and in particular to provide a load transporter for transporting loads, preferably tool cases, as a rack system.

The present invention provides a foldable load transporter as a rack system. For this purpose, it is envisaged to fasten the load transporter on a wall by means of at least one adjustable fastening device arranged on the wall. As a result, not only secure positioning but also safe transportation of the load transporters together with a load can be made possible on a wall, in particular on a vehicle wall.

BRIEF DESCRIPTION OF THE DRAWINGS

Further advantages are evident from the following description of the figures. In the figures, various exemplary embodiments of the present invention are represented. The figures, the description and the claims contain numerous features in combination. A person skilled in the art will expediently also consider the features individually and combine them to produce useful further combinations.

In the figures, identical and similar components are denoted by identical reference signs.

In the figures:

Figure 4A:
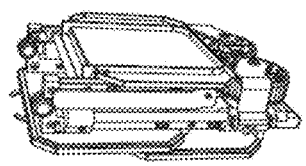
Figure 4B:
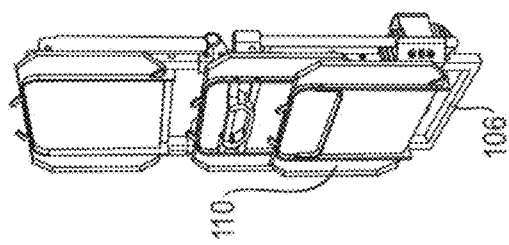
Figure 4C:
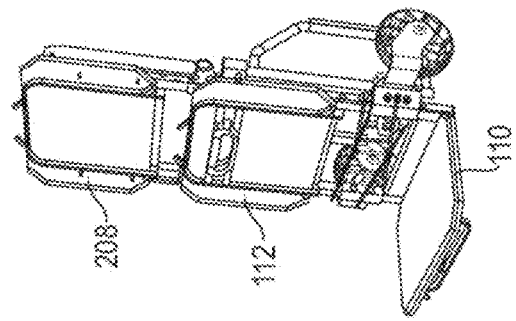
Figure 4D:
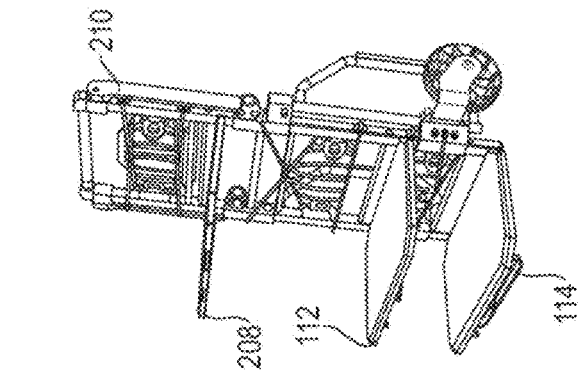
Figure 4E:
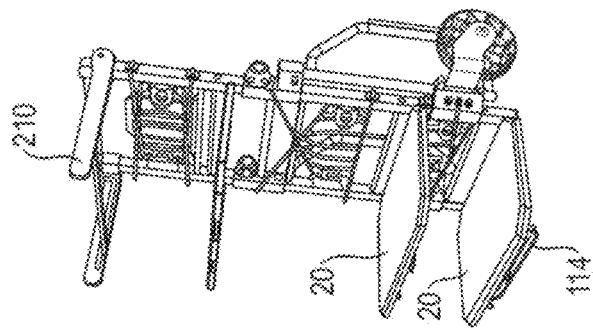
Figure 7:
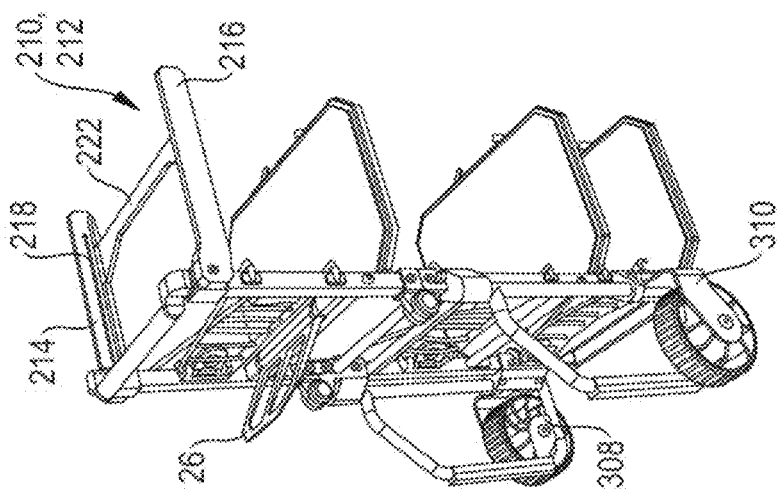
Figure 6:
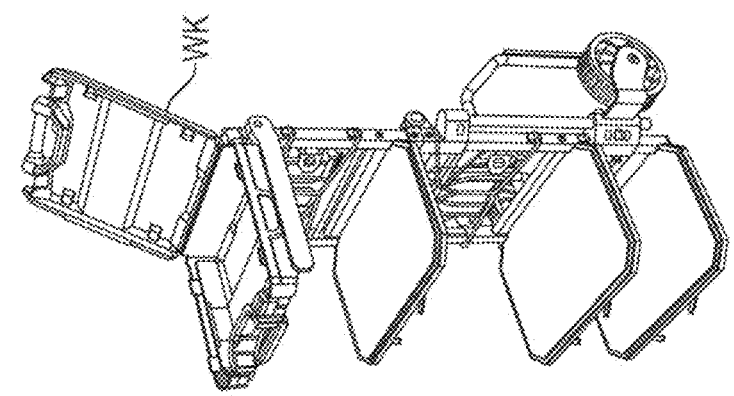
Figure 5:
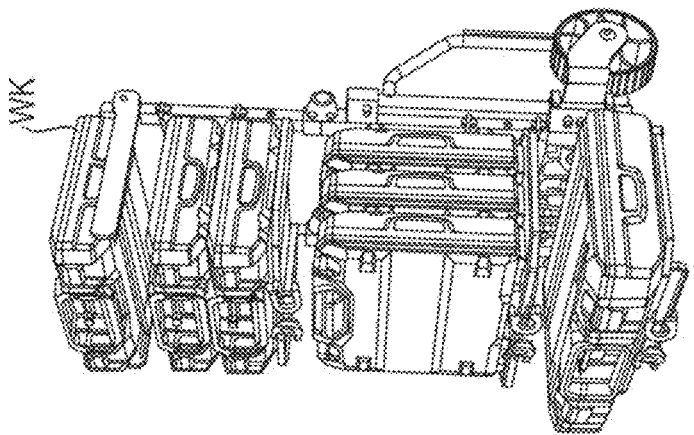
Figure 10:
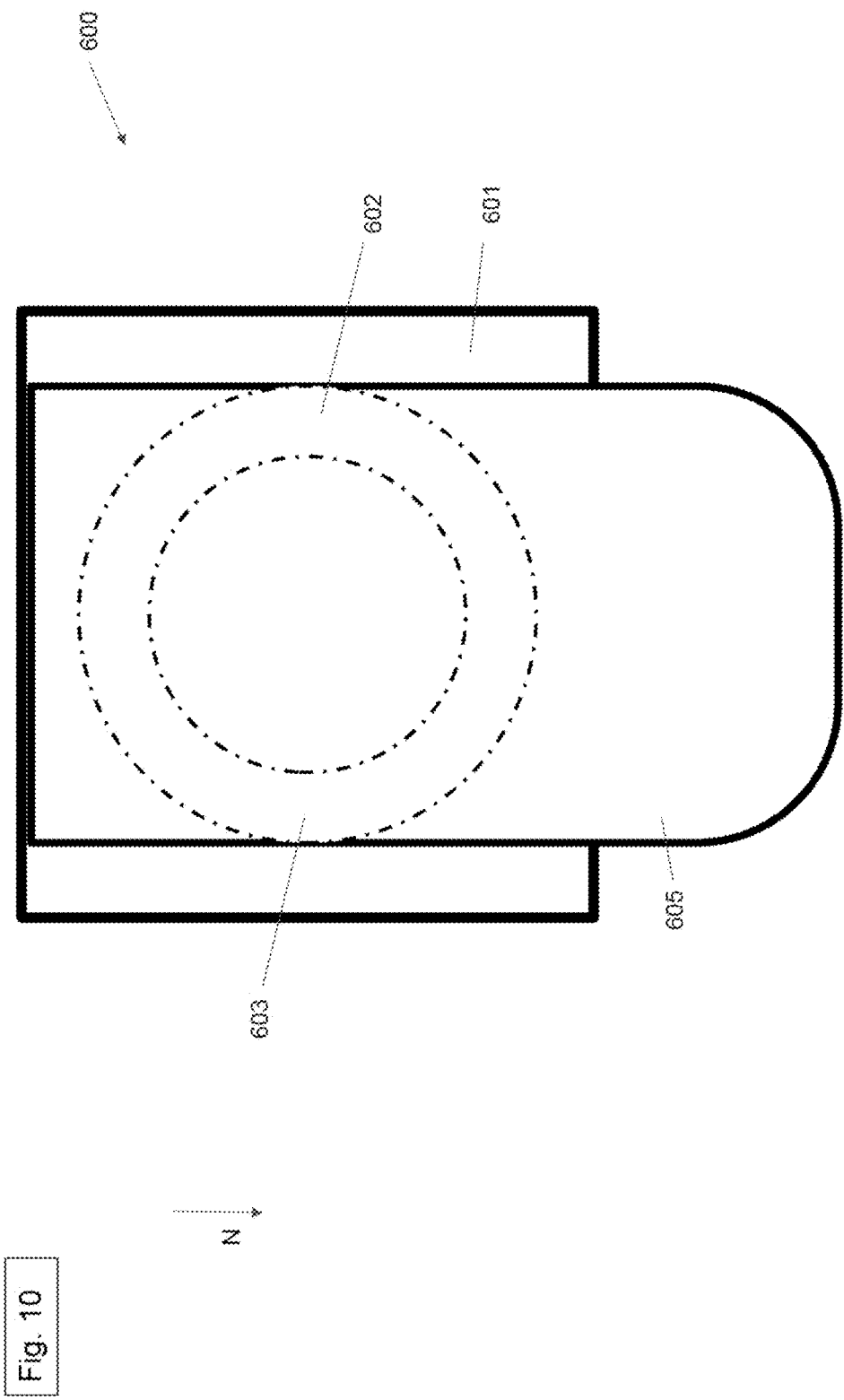
Figure 11:
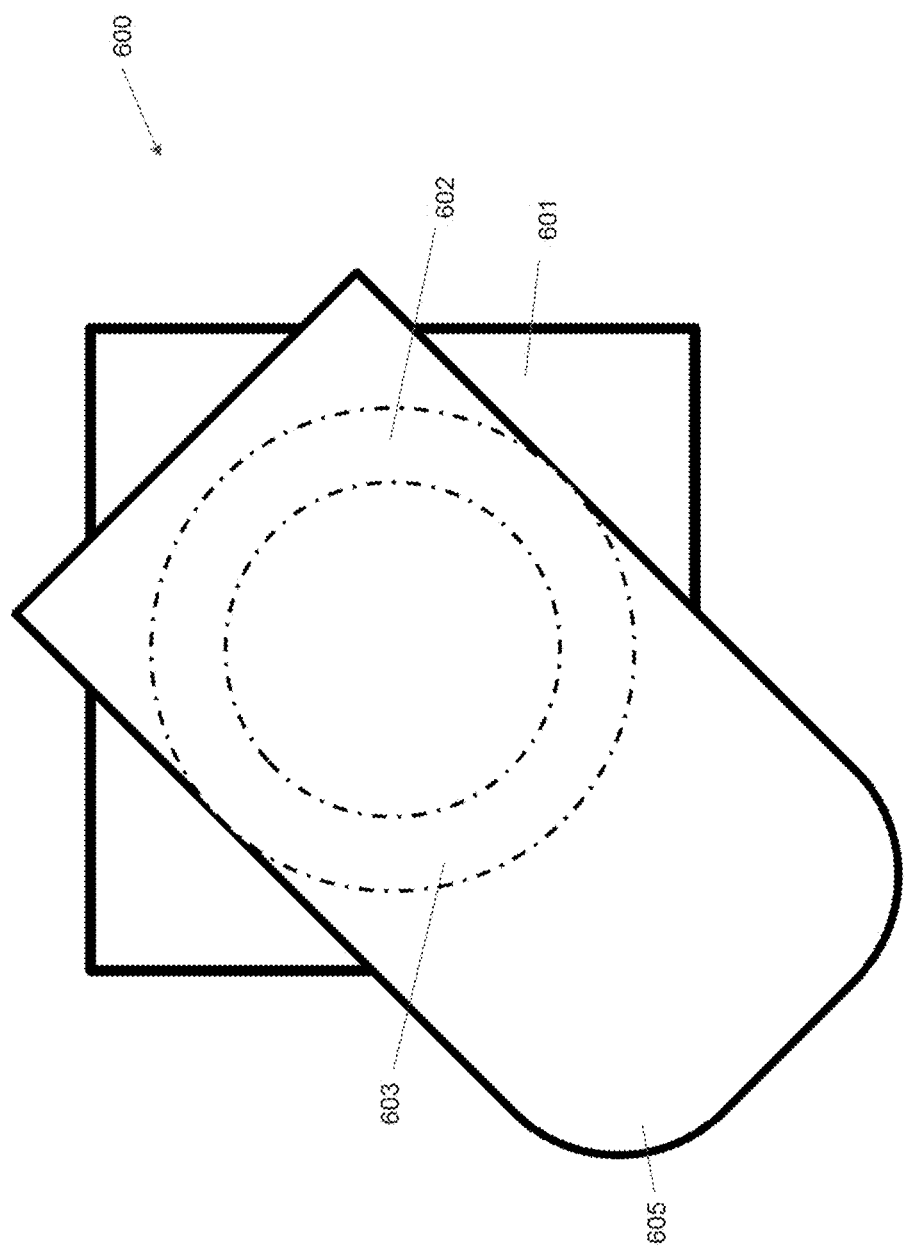
Figure 12:
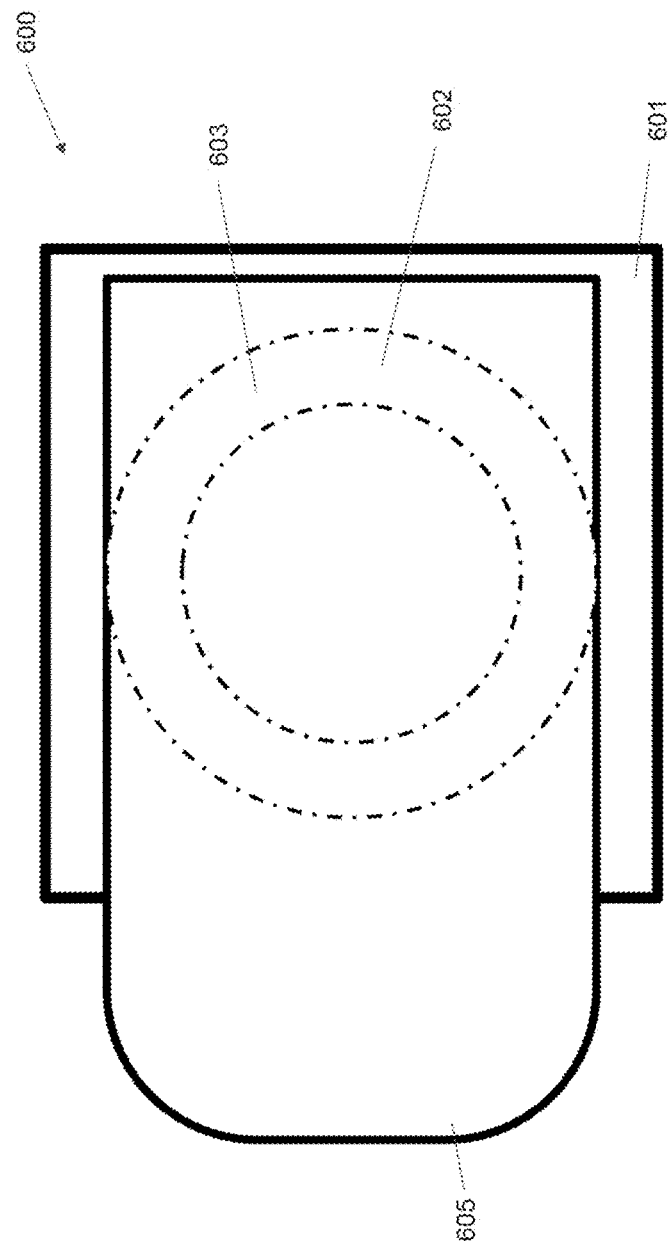
Figure 13:
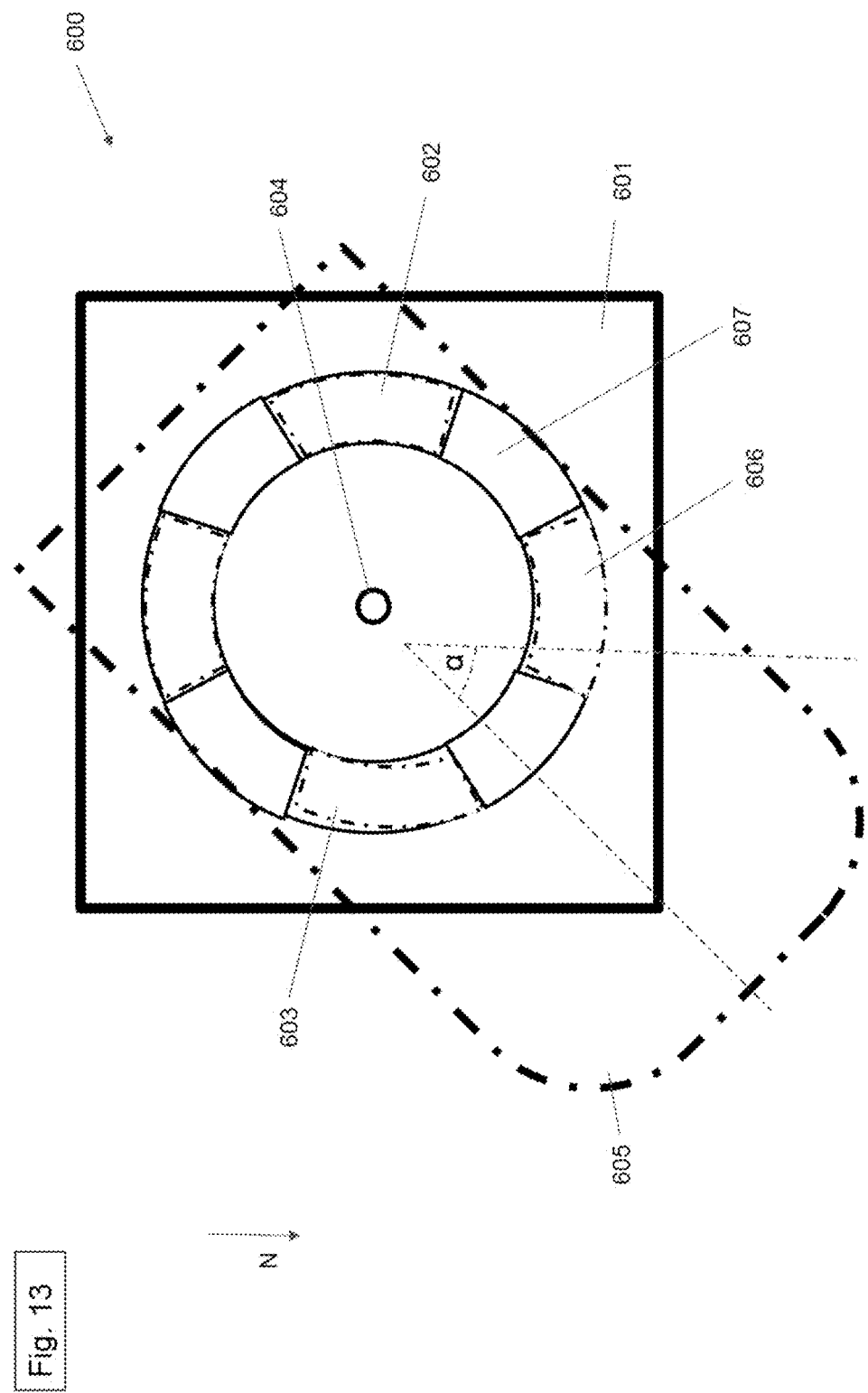
Figure 14:
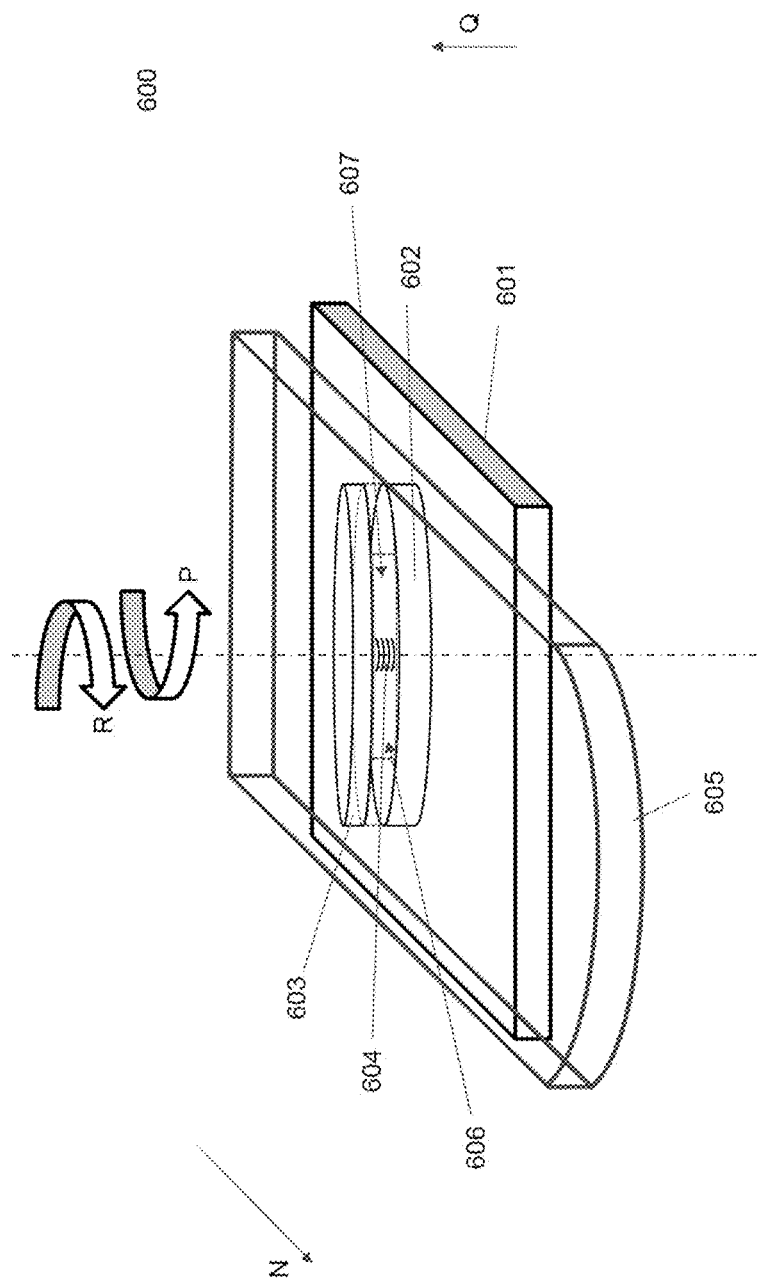
Figure 15:
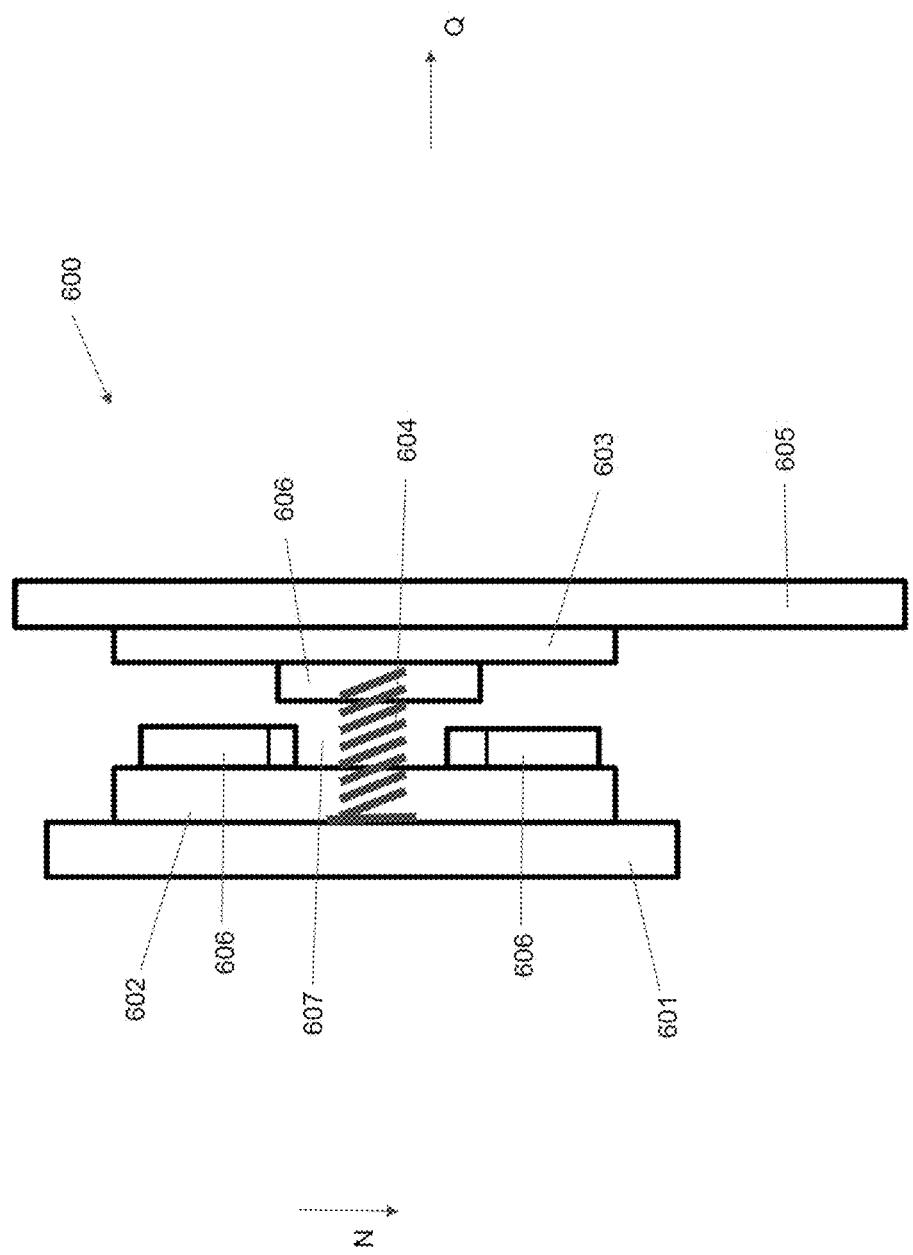

FIG. 1 shows a load transporter according to the invention in the unfolded state of use, in a perspective front view obliquely from below, FIG. 2 shows a load transporter according to the invention in the unfolded state, in a frontal side view, FIG. 3 shows a load transporter according to the invention in the folded-together state of use, in a perspective side view obliquely from above, FIG. 4A-4E show by way of example an operation of folding together a load transporter according to the invention from the unfolded state of use into the folded-together state, FIG. 5 shows a fully laden load transporter according to the invention in the unfolded state of use, in a perspective front view obliquely from below, FIG. 6 shows a load transporter according to the invention laden with a tool case in the unfolded state of use, in a perspective front view obliquely from above, FIG. 7 shows a load transporter according to the invention in the unfolded state of use, in a perspective rear view obliquely from above, FIG. 8 shows a wheel of a load transporter according to the invention, FIG. 9A-9B show the load transporter according to the invention in a state in which it is away from a fastening device and a state in which it is suspended in the fastening device for using the load transporter according to the invention as a rack system, FIG. 10 shows a plan view of a further embodiment of the fastening device in the form of a separate holding element;

FIG. 11 shows a further plan view of the further embodiment of the fastening device in the form of the separate holding element, a holding bar of the holding element being turned slightly in the clockwise direction;

FIG. 12 shows a further plan view of the further embodiment of the fastening device in the form of the separate holding element, the holding bar of the holding element having been turned 90° in the clockwise direction;

FIG. 13 shows a plan view of the further embodiment of the fastening device in the form of the separate holding element, with a base plate, a first turntable, a second turntable, a spring and a holding bar, FIG. 14 shows a perspective view of the further embodiment of the fastening device in the form of the separate holding element, with the base plate, the first turntable, the second turntable, the spring and the holding bar, FIG. 15 shows a side view of the further embodiment of the fastening device in the form of the separate holding element, with the base plate, the first turntable, the second turntable, the spring and the holding bar, in a disassembled state, and FIG. 16 shows a side view of the further embodiment of the fastening device in the form of the separate holding element, with the base plate, the first turntable, the second turntable, the spring and the holding bar, in an assembled state.

DETAILED DESCRIPTION

An exemplary embodiment of a foldable load transporter 1 is represented in FIGS. 1 to 3. FIGS. 1 and 2 show the load transporter 1 in its unfolded state of use, tilted slightly out of a vertical position, while FIG. 3 shows the folded-together state of the load transporter 1. Hereinafter, the directional indications "upward", "above", "downward" and "below" refer to the direction of gravitational force g.

The load transporter 1 comprises a carrier frame 10. The carrier frame 10 in turn comprises a first carrier frame portion 100, extending in a first plane of extent E1, and a second carrier frame portion 200, extending in a second plane of extent E2. Moreover, the first carrier frame portion 100 extends along a first longitudinal direction L1 and the second carrier frame portion 200 extends along a second longitudinal direction L2. The first carrier frame portion 100 has a lower end 100a and an upper end 100b. Similarly, the second carrier frame portion 200 has a lower end 200a and an upper end 200b.

The unfolded state of use of the load transporter 1 defines hereinafter a front side VS and a rear side RS of the carrier frame 10, or the first and second carrier frame portions 100, 200 thereof.

On the rear side RS of the first carrier frame portion 100 there are two wheels 300, which serve for moving the load transporter 1. The design of the wheels 300 of the load transporter 1 is described in more detail below.

As can be seen from FIGS. 1 to 3, the first carrier frame portion 100 has two parallel-running longitudinal struts 102, 104, which are connected to one another by a lower transverse strut 106 at the lower end 100a of the first carrier frame portion 100 and an upper transverse strut 108 at the upper end 100b of the first carrier frame portion 100. In a similar way, the second carrier frame portion 100 has two parallel-running longitudinal struts 202, 204, which are connected to one another by an upper transverse strut 206 at the upper end 200b of the second carrier frame portion 200.

The first longitudinal strut 102 of the first carrier frame portion 100 is connected in an articulated manner to the first longitudinal strut 202 of the second carrier frame portion 200 by a first articulated connection 12. In a corresponding way, the second longitudinal strut 104 of the first carrier frame portion 100 is connected in an articulated manner to the second longitudinal strut 202 of the second carrier frame portion 200 by a second articulated connection 14. In other words: The lower end 200a of the second carrier frame portion 200 is coupled to the upper end 100b of the first carrier frame portion 100 by the two articulated connections 12, 14. In the unfolded state of use of the load transporter 1, the articulated connections 12, 14 define a substantially horizontally running carrier frame pivot axis X between the first and second carrier frame portions 100, 200. In this way, the second carrier frame portion 200 is pivotable in relation to the first carrier frame portion 100 about the carrier frame pivot axis X between a folded-together position (FIG. 3) and an unfolded position (FIGS. 1 and 2).

As can be seen in FIGS. 1 and 2, in its unfolded position, the second carrier frame portion 200 lies above the first carrier frame portion 100. The first and second planes of extent E1, E2 of the first and second carrier frame portions 100, 200, respectively, are in this case substantially parallel to one another. In the unfolded state of use of the load transporter 1, the second carrier frame portion 200 is in its unfolded position. Moreover, in the unfolded state of use of the load transporter 1, the first and second load carrier portions 100, 200 preferably extend along a common longitudinal direction L, so that the first and second longitudinal directions L1, L2 are coaxial to one another.

Arranged on the front side VS of the first carrier frame portion 100 are two shelves 110, 112. The lower shelf 110 of the first carrier frame portion 100 is arranged near the lower end 100a of the first carrier frame portion 100 and below the upper shelf 112 of the first carrier frame portion 100. The lower shelf 110 is pivotable about a pivot axis A1 and the upper shelf 112 is pivotable about a pivot axis A2 between a folded-in position and a folded-out position (FIG. 4A to 4E).

Along with the two shelves 110, 112 of the first carrier frame portion 100, the second carrier frame portion 200 also has two shelves 208, 210 on its front side VS. The upper shelf 210 of the second carrier frame portion 200 is arranged near the upper end 200b of the second carrier frame portion 200 and above the lower shelf 208 of the second carrier frame portion 200. The lower shelf 208 is pivotable about a pivot axis A3 and the upper shelf 210 is pivotable about a pivot axis A4 between a folded-in position and a folded-out position (FIG. 4A to 4E).

In FIGS. 1 and 2, the shelves 110, 112, 208, 210 are shown in their folded-out position, perpendicular to the first and second planes of extent E1, E2 of the first and second carrier frame portions 100, 200, respectively. In their folded-out position, the shelves 110, 112, 208, 210 of the carrier frame 10 and of the first and second carrier frame portions 100, 200 respectively define a downwardly facing underside 110a, 112a, 208a, 210a and an upwardly facing upper side 110b, 112b, 208b, 210b.

In order to transfer the two shelves 110, 112 of the first carrier frame portion 100 and the lower shelf 208 of the second carrier frame portion 200 out of their folded-out position into the folded-in position, the shelves 110, 112, 208 are respectively pivoted upward, i.e. counter to the direction of gravitational force g (in the clockwise direction in the exemplary embodiment represented), about a pivot axis A1, A2, A3 assigned to the respective shelf 110, 112, 208. In order to keep the two shelves 110, 112 of the first carrier frame portion 100 and the lower shelf 208 of the second carrier frame portion 200 securely in the respective folded-in position, locking means are provided. The pivoting movements of the shelves 110, 112, 208, 210 of the carrier frame 10 are explained more specifically below with reference to FIG. 4A to 4E.

The load transporter 1 also comprises two wheel suspensions 302, which are constructed substantially identically to one another. Hereinafter, therefore, only the construction of one of the wheel suspensions 302 is discussed.

The wheel suspension 302 comprises a first rod 304, which extends in the longitudinal direction L1 of the first carrier frame portion 100 and has an upper end 304b and a lower end 304a. The first rod 304 is mounted near its lower end 304a in a first rotary bearing 16. The upper end 304b of the rod 304 is mounted in a second rotary bearing 18. This arrangement defines a wheel suspension pivot axis S, which extends along the rod 304 and about which the wheel suspension 302 is pivotable.

The wheel suspension pivot axes S of the two wheel suspensions 302 are parallel to one another and perpendicular to the carrier frame pivot axis X and the longitudinal direction L1 of the first carrier frame portion 100. As a result of the pivotable mounting of the two wheel suspensions 302, they, together with the wheels 300, are pivotable independently of one another between a folded-in position and a folded-out position.

Formed on the first rod 304 of the wheel suspension 302 is a second rod 306. To be more precise, the second rod 306 is integrally connected at its upper end 306b to the upper end 304b of the first rod 304 and at its lower end 306a to the lower end 304a of the first rod 304. The first and second rods 304, 306 lie in a common plane of extent. In the folded-in position of the wheel suspensions 302, the plane of extent defined by the first and second rods 304, 306 runs parallel to the plane of extent E1 of the first carrier frame portion 100 (FIG. 3).

The second rod 306 has an upper rod portion 306c, a middle rod portion 306d and a lower rod portion 306e. The upper rod portion 306c may serve for example as a handle for an operator of the load transporter 1.

The middle rod portion 306d runs parallel to and at a distance from the first rod 304. In the exemplary embodiment represented, a slide rail 312 is attached on the side of the middle rod portion 306d that is facing away from the rear side RS of the first carrier frame portion 100. The second rod 306 and the slide rail 312 provided on it make it possible for steps or other obstacles to be overcome more easily in comparison with the case where such a construction is not present.

The lower rod portion 306e of the second rod 306 is integrally connected to a first supporting arm 308 (FIG. 7) and the lower rod portion of the first rod 304 is integrally connected to a second supporting arm 310. Between the first and second supporting arms 308, 310, the wheel 300 of the wheel suspension 302 is mounted in such a way that the wheel 300 is rotatable about a wheel axis R.

The wheel axes R are arranged perpendicular to the first plane of extent E1, E2 of the first carrier frame portion 100 in the folded-in position of the wheel suspensions 302 and parallel to the first plane of extent E1 of the first carrier frame portion 100 in the folded-out position of the wheel suspensions 302. The two wheel axes R are coaxial to one another in the folded-out position of the wheel suspensions 302.

The operation of folding together a load transporter 1 according to the invention is now to be described on the basis of FIG. 4A to 4E.

The load transporter 1 represented in FIG. 4A corresponds substantially to that of FIGS. 1 and 2. The load transporter 1 of FIG. 4A is in the unfolded state of use, all of its shelves 110, 112, 208, 210 being folded out, that is to say being in their folded-out position.

In the unfolded state of use of the load transporter 1 represented in FIGS. 2 and 4A, the longitudinal directions L1, L2 of the first and second carrier frame portions run substantially parallel to one another and approximately parallel to the direction of gravitational force g. The deviation from the vertical alignment of the load transporter 1 is caused by an elongate supporting device 114 arranged on the underside 110a of the lower shelf 110 of the first carrier frame portion 100. As can be seen in FIGS. 2 and 4A, the load transporter 1 is supported on the supporting device 114 and also the lower transverse rod 106 and the lower ends of the first and second longitudinal struts 102, 104 of the first carrier frame portion 100. The longitudinal directions L1, L2 form an angle of inclination a of approximately 6° with the direction of gravitational force g. In use, the load transporter 1 can be tilted from this unfolded state of use of FIGS. 2 and 4A by being supported on the wheels 300, so that the angle of inclination a is increased from approximately 6° to a higher value. In FIGS. 2 and 4A, the wheels 300 are not in contact with the ground, but hover a small distance above the ground. The hovering arrangement of the wheels 300 makes it easier for the load transporter 1 to be tilted from the unfolded state of use. The lower transverse strut 106 may also be used for tilting.

In FIG. 4B, the upper shelf 210 of the second carrier frame portion 200 has been pivoted out of its folded-out position into its folded-in position. The pivot angle covered in this pivoting movement is greater than 180°. Since, in FIG. 4B, the upper shelf 210 of the second carrier frame portion 200 in the folded-out position is substantially perpendicular to the plane of extent E2 of the second carrier frame portion 200, the pivot angle completed by the upper shelf 210 between the representations of FIGS. 4A and 4B is substantially 270°. In FIG. 4B, the upper shelf 210 is on the rear side RS of the second carrier frame portion 200.

In FIG. 4C, the lower shelf 208 of the second carrier frame portion 200 and the upper shelf 112 of the first carrier frame portion 100 have been moved out of the folded-out position into the folded-in position. The pivot angle covered in this upwardly directed pivoting movement is substantially 90°. In the folded-in position, the upper side 112b of the upper shelf 112 of the first carrier frame portion 100 and the upper side 208b of the lower shelf 208 of the second carrier frame portion 200 come to lie at least partially against the front side VS of the carrier frame 10. The upper shelf 112 of the first carrier frame portion 100 and the lower shelf 208 of the second carrier frame portion 200 do not overlap one another in their folded-in positions.

In FIG. 4D, the lower shelf 110 of the first carrier frame portion 100 has also been transferred from its folded-out position into its folded-in position. As in the case of the lower shelf 208 of the second carrier frame portion 200 and the upper shelf 112 of the first carrier frame portion 100, in this pivoting movement the lower shelf 110 of the first carrier frame portion 100 has been folded upward by a pivot angle of substantially 90°. In its folded-in position, the upper side 110b of the lower shelf 110 of the first carrier frame portion 100 lies against the underside 112a of the upper shelf 112 of the first carrier frame portion 100, at least to the extent that the lower and upper shelves 110, 112 of the first carrier frame portion 100 overlap one another in the longitudinal direction L1 of the first carrier frame portion 100. If the shelves 110, 112, 208, 210 are in their folded-in positions, as they are represented in FIG. 4D, they are substantially parallel to the first and second planes of extent E1, E2 of the first and second carrier frame portions 100, 200, respectively.

Furthermore, in FIG. 4D, the two wheel suspensions 302 have been pivoted about their respective wheel suspension pivot axis S out of the folded-out position into the folded-in position.

FIG. 4E shows the folded-together state of the load transporter 1. In order to get from the arrangement of FIG. 4D to the arrangement of FIG. 4E, the second carrier frame portion 200 is pivoted downward in relation to the first carrier frame portion 100 about the carrier frame pivot axis X. In this pivoting movement, the pivot angle is substantially 180°.

As can be seen from FIG. 4E, in the folded-together position of the second carrier frame portion 200, the rear side RS of the second carrier frame portion 200 lies opposite the rear side RS of the first carrier frame portion 100, so that the second plane of extent E2 of the second carrier frame portion 200 is arranged substantially parallel to the first plane of extent E1 of the first carrier frame portion 100.

The described foldable arrangement both of the second carrier frame portion 200 in relation to the first carrier frame portion 100 and of its lower and upper shelves 110, 208, 112, 210 makes it possible to fold the load transporter 1 together to a compact size that can be handled well. This allows easier transportation and space-saving stowage of the load transporter 1. For example, the folded-together load transporter 1 can itself be carried by an operator in one hand like a case.

In the exemplary embodiment represented, the load transporter 1 has in its unfolded state of use an overall length of approximately 1110 mm (measured in the longitudinal direction L1, L2), a width of approximately 693 mm (measured perpendicularly to the planes of extent E1, E2) and a width of approximately 664 mm (measured in the direction of the carrier frame pivot axis X). In the folded-together state, the load transporter 1 has a length of approximately 725 mm (measured in the longitudinal direction L1), a width of approximately 201 mm (measured perpendicularly to the plane of extent E1) and a width of approximately 520 mm (measured in the direction of the carrier frame pivot axis X).

The foldable design of the shelves 110, 112, 208, 210 of the carrier frame 10 makes it possible for the load transporter 1 to be loaded particularly flexibly, for example with tool cases WK (FIG. 5). Depending on which of the shelves 110, 112, 208, 210 are folded out or folded in, larger or smaller tool cases WK or other loads can be transported on the load transporter 1. For example, in the arrangement of the shelves 110, 112, 208, 210 that is represented in FIG. 4C, the load transporter 1 can receive a particularly large load on the lower shelf 110 of the first carrier frame portion 100.

The lower and upper shelves 110, 112 of the first carrier frame portion 100 and the lower shelf 208 of the second carrier frame portion 200 are formed as planar plates. As represented in FIG. 5, tool cases WK for example can be placed on these three shelves 110, 112, 208, lying stacked one on top of the other and standing next to one another. On the upper sides 110b, 112b, 208b of the shelves 110, 112, 208, a nonslip covering 20 is provided.

The width of the resting areas, i.e. the effectively usable area of the upper sides 110b, 112b of the lower and upper shelves 110, 112, is approximately 368 mm (measured in each case perpendicularly to the plane of extent E1) and that of the lower shelf 208 is approximately 343 mm (measured perpendicularly to the plane of extent E2). The width of the resting areas of the shelves 110, 112, 208 is approximately 520 mm (measured in the direction of the carrier frame pivot axis X).

For fixing the tool cases WK on the shelves 110, 112, 208, straps GT may be used (FIG. 1). For attaching straps GT to the carrier frame 10, arranged on the first and second carrier frame portions 100, 200 are first coupling means 22, which can be coupled to first counter-coupling means provided at one end of a strap. Provided at the ends of the shelves 110, 112, 208 of the carrier frame 10 that are the upper ends in the folded-in position are second coupling means 24, which can be releasably connected to second counter-coupling means at the other end of the strap GT. The straps GT may be flexible (for example made of rubber) or non-flexible (for example lashing straps).

The upper shelf 210 of the second carrier frame portion 200 differs structurally from the other three shelves 110, 112, 208 of the carrier frame 10. The upper shelf 210 of the second carrier frame portion 200 comprises a supporting frame 212, which has two guide rails 214, 216, which run parallel to one another and are connected in an articulated manner to the second carrier frame portion 200. The supporting frame 212 also has a transverse strut 222, connecting the two guide rails 214, 216 to one another on their underside 210a. Respectively provided on the inner areas of the two guide rails 214, 216 that lie opposite one another is a guiding structure 218, 220 extending along the longitudinal direction of the guide rails 214, 216.

If a tool case WK is provided, for instance along its side areas, with counter-engaging structures that are complementary to the two engaging structures 218, 220 of the upper shelf 210 of the second carrier frame portion 200, the tool case WK can be pushed in a lying position onto the folded-out upper shelf 210 (FIGS. 5 and 6). The tool case WK is in this case held by the transverse strut 222 of the upper shelf 210 and by the engagement of the engaging structures 218, 220 in the corresponding counter-engaging structure. Straps, such as those described in connection with the other shelves 110, 112, 208, are not required in the case of the upper shelf 210 of the second carrier frame portion 200. As a result, the upper shelf 210 allows the tool case WK to be readily opened or closed according to requirements (FIG. 6).

In order to make it easier for the load transporter 1 to be carried in its folded-together state, a handle arrangement 116 is provided on the underside 112a of the upper shelf 112 of the first carrier frame portion 100. The handle arrangement 116 is arranged in such a way that, in the folded-in position of the upper and lower shelves 112, 110 of the first carrier frame portion 100, the handle arrangement 116 lies above the upper end of the lower shelf 110. Moreover, the handle arrangement 116 is arranged in such a way that, in the folded-together state of the load transporter 1, it lies just below the carrier frame pivot axis X and substantially level with the upper transverse strut 108 of the first carrier frame portion 100. The handle arrangement 116 does not protrude beyond the upper end of the upper shelf 112 and is designed such that it can be gripped from behind.

As FIG. 7 reveals, arranged on the rear side RS of the second carrier frame portion 200 is a hook device 26, which can be moved between a folded-in position and a folded-out position. The folded-in position of the hook device 26 is represented for example in FIG. 1. The hook device 26 may serve for holding cables, hoses or the like.

There follows a description of the construction of the wheels 300, which may also represent an independent aspect of the present invention. Since the wheels 300 are identical to one another, hereinafter only one of the wheels 300 is discussed.

The wheel 300 comprises a continuous, non-inflatable and non-pneumatic tire 314 and a hub 318, which are connected to one another by identical spokes 320 arranged at equal distances. The tire 314 has a profiled tread 316. The tire 314, the hub 318 and the spokes 320 are formed integrally with one another. The wheel 300 is formed for example from a polymeric material. The spokes 320 are formed in such a way that they provide compliant support. Each spoke 320 has an end 320a, nearer to the hub 318, and an end 320b, nearer to the tire 314, and extends in the longitudinal direction along an area of extent. The area of extent of a spoke 320 is not straight, but curved in a U-shaped or invertedly U-shaped manner. To be more precise, each spoke 320 has in the longitudinal direction a portion 320c, nearer the hub 318, and a portion 320e, nearer the tire 314, and also a middle portion 320d, situated between these two portions 320c, 320e. The portion 320c that is nearer the hub 318 and the portion 320e that is nearer the tire 314 are of approximately the same length and are shorter than the middle portion 320d (measured in the longitudinal direction of the spoke 320). A hinge joint 322b, 322c is respectively formed between the portion 320c that is nearer the hub 318 and the middle portion 320d and also between the portion 320e that is nearer the tire 314 and the middle portion 320d in such a way that the cross-sectional area of the spoke 320 (measured perpendicularly to the area of extent of the spoke 320) is smaller in the region of the hinge joint 322b, 322c than outside this region. Such a hinge is also referred to as a film hinge. In the connecting region between the tire 314 and the spoke 320 and also between the hub 318 and the spoke 320, respectively formed facing the spoke 320 are an elevation 324 on the hub 318 and an elevation 328 on the tire, to which the spoke 320 is again articulated by a film hinge 322a, 322d.

The unfolded load transporter 1 is suitable for use as a rack system. As represented in FIGS. 9A and 9B, for this purpose the load transporter 1 is kept in its unfolded state of use by a fastening device 500 fixed on a wall. The fastening device 500 has a beam 502 with a guiding channel 504 extending along the beam 502. A lever arrangement 506 arranged at the upper end of the beam 502 is coupled to two holding brackets 508, 510 by way of connecting means 512 running in the guiding channel 504. One of the holding brackets 508 is at the lower end of the beam, while the other holding bracket 510 is arranged at the upper end of the beam 502, below the lever arrangement 506. By actuating the lever arrangement 506, the holding brackets 508, 510 can be moved along the beam 502 in guiding grooves 514.

The lever arrangement 506 is movable between a released state (FIG. 9A) and a clamped state (FIG. 9B). By transferring the lever arrangement 506 from the released state into the clamped state, the holding brackets 508, 510 move downward along the beam 502. The downward movement of the holding brackets 508, 510 allows a load transporter 1 to be fixed on the fastening device 500. In the exemplary embodiment represented, the upper holding bracket 510 is designed to come into engagement with the upper transverse strut 206 of the second carrier frame portion 200. By contrast, the lower holding bracket 508 is designed to reach partially around the wheels 300 from above of the wheel suspension 302 in its folded-in state.

According to a further embodiment of the fastening device 500, both the lower holding bracket 508 and the upper holding bracket 510 may be designed as a separate holding element 600. In a specific embodiment, the fastening device 500 may in this case comprise at least a single holding element 600, two holding elements 600 or more than two holding elements 600.

As shown in FIGS. 10 to 12, the holding element 600 comprises a base plate 601, a first turntable 602, a second turntable 603, a spring 604 and also a holding bar 605 The base plate 601 has substantially a square base area. The holding bar 605 comprises an elongate base area. An edge area of the holding bar 605 is in this case designed as curved or arcuate.

The holding element 600 may be fastened with the aid of the base plate 601 on a wall, in particular a vehicle wall. The fastening may be performed by screws, which are led through corresponding drilled holes of the base plate. The drilled holes are not represented in the figures. Alternatively, the base plate 601 may also be adhesively attached to a wall.

The holding bar 605 serves for fixing an unfolded or folded-together load transporter 1 on a wall. For this purpose, an underside of the holding bar 605 acts on the upper transverse strut 206 of the second carrier frame portion 200 of the load transporter 1.

The first turntable 602 is positioned on an upper side of the base plate 601 and the second turntable 603 is positioned on an underside of the holding bar 605.

Both the first turntable 602 and the second turntable 603 comprise a multiplicity of teeth 606. Between the teeth 606, interspaces 607 are provided. The teeth 606 of the first turntable 602 extend in the direction Q from an upper side of the first turntable 602 and the teeth 606 of the second turntable 603 extend counter to the direction Q from an underside of the second turntable 603. The teeth 606 of the first and second turntables 602, 603 are designed in a corresponding manner. However, the teeth 606 are respectively arranged offset on the upper side of the first turntable 602 and underside of the second turntable 603, respectively, such that the teeth 606 of the turntables 602, 603 can be positioned in the respective interspaces 607 between the teeth 606 of the turntables 602, 603. With the aid of the teeth 606 and the interspaces 607, the turntables 602, 603 can be arranged at various angular positions in relation to one another.

Arranged between the two turntables 602, 603 is a spring 604. The spring 604 is designed in the form of a tension spring and connects the two turntables 602, 603 to one another. The ends of the spring 604 are in this case respectively connected rotatably to the turntables 602, 603 by way of rotary bearings. The rotary bearings are not represented in the figures. As represented in the figures, the two turntables 602, 603 can be pulled apart in the direction Q counter to the tensile force of the spring 604. The pulling apart of the two turntables 602, 603 has the effect that the teeth 606 are pulled out of the interspaces 607, so that the turntables 602, 603, and the base plate 601 and the holding bar 605, can also be separated from one another. With the aid of the rotary bearings, the turntables 602, 603, and the base plate 601 and the holding bar 605, can be turned in relation to one another. The arrangement of the teeth 606 in the interspaces 607 can be freely chosen in direction of rotation R or P, so that the base plate 601 and the holding bar 605 can be arranged at a rotational angle α in relation to one another.

For the actual fixing of a load transporter 1 on a wall, the holding bar 605 is first pulled from the base plate 601 counter to the spring force of the spring 604 in the direction Q, so that the teeth 606 are moved out of the interspaces 607. Subsequently, the holding bar 605 is turned in a direction of rotation R or P. The turning of the holding bar 605 has the effect of producing a free space between the holding bar 605 and the base plate 601, into which the upper transverse strut 206 of the second carrier frame portion 200 of the load transporter 1 can be positioned. The holding bar 605 is subsequently turned back again, so that the transverse strut 206 is held between the holding bar 605 and the base plate 601.

LIST OF REFERENCE SIGNS

1 Load transporter
g Direction of gravitational force
10 Carrier frame
100 First carrier frame portion
200 Second carrier frame portion
E1 First plane of extent of the first carrier frame portion
E2 Second plane of extent of the second carrier frame portion
L1 First longitudinal direction of the first carrier frame portion
L2 Second longitudinal direction of the second carrier frame portion
100b, 100a Upper and lower ends of the first carrier frame portion
200b, 200a Upper and lower ends of the second carrier frame portion
VS Front side of the carrier frame
RS Rear side of the carrier frame
300 Wheels
102, 104 First and second longitudinal struts of the first carrier frame portion
202, 204 First and second longitudinal struts of the second carrier frame portion
106, 108 Lower and upper transverse struts of the first carrier frame portion
206 Upper transverse strut of the second carrier frame portion
12, 14 First and second articulated connections
X Carrier frame pivot axis
L Common longitudinal direction
110, 112 Lower and upper shelves of the first carrier frame portion
208, 210 Lower and upper shelves of the second carrier frame portion
A1, A2, A3, A4 Pivot axes of the shelves
110a, 112a, 208a, 210a Undersides of the shelves
110b, 112b, 208b, 210b Upper sides of the shelves
302 Wheel suspensions
304, 306 First and second rods of the wheel suspension
304b, 304a Upper and lower ends of the first rod
16, 18 First and second rotary bearings
S Wheel suspension pivot axes
306b, 306a Upper and lower ends of the second rod
308, 310 First and second supporting arms
306c, 306d, 306e Upper, middle and lower rod portions of the second rod 312 Slide rail
WK Tool case
20 Nonslip covering
GT Strap
22 First coupling means on the carrier frame
24 Second coupling means on the shelves
114 Supporting device
α Angle of inclination of the carrier frame
212 Supporting frame
214, 216 Guide rails
218, 220 Engaging structures
222 Transverse strut
116 Handle arrangement
314 Tire
316 Tread
318 Hub
320 Spoke
322a, 322b, 322c, 322d Hinge joints
320a The end of a spoke nearer the hub
320b The end of a spoke nearer the tire
320c, 320d, 320e Spoke portions
324 Elevation on the hub
326 Elevation on the tire
26 Hook device
500 Fastening device
502 Beam
504 Guiding channel
506 Lever arrangement
508, 510 Lower and upper holding brackets
512 Connecting means
514 Guiding grooves
601 Base plate
602 First turntable
603 Second turntable 603
604 Spring
605 Holding bar
606 Teeth
607 Interspaces

What is claimed is:

1. A method for using a load transporter for transporting loads as a rack system, comprising:
    fastening the load transporter on a wall using at least one adjustable fastener arranged on the wall, wherein the at least one adjustable fastener includes a holding element, the holding element including a base plate, a first turntable, a second turntable, a spring and a holding bar, wherein both the first turntable and the second turntable include teeth that cooperatively engage; and
    arranging the first and second turntable at various angular positions in relation to one another via the teeth.

2. The method as recited in claim 1 wherein the loads are tool cases.

3. The method as recited in claim 1 wherein the holding bar has an elongate base area.

4. The method as recited in claim 1 wherein the holding bar has a curved edge area.

5. The method as recited in claim 1 wherein the base plate has a square base area.

6. The method as recited in claim 1 further comprising fastening the holding element via the base plate on the wall.

7. The method as recited in claim 1 wherein the spring is a tension spring connecting the first and second turntable.

* * * * *